Dec. 26, 1922.

E. E. NEAL.
TAPER ROLLER BEARING.
FILED JULY 31, 1917.

1,440,312.

WITNESS:

INVENTOR
Elmer E. Neal
BY
Augustus B. Stoughton
ATTORNEY.

Patented Dec. 26, 1922.

1,440,312

UNITED STATES PATENT OFFICE.

ELMER E. NEAL, OF PHILADELPHIA, PENNSYLVANIA, ASSIGNOR, BY MESNE ASSIGNMENTS, TO STANDARD STEEL AND BEARINGS INCORPORATED, OF WILMINGTON, DELAWARE, A CORPORATION OF DELAWARE.

TAPER ROLLER BEARING.

Application filed July 31, 1917. Serial No. 183,678.

*To all whom it may concern:*

Be it known that I, ELMER E. NEAL, a citizen of the United States, and a resident of Philadelphia, in the county of Philadelphia and State of Pennsylvania, have invented certain new and useful Improvements in Taper Roller Bearings, of which the following is a specification.

The principal objects of the present invention are, first, to effect an economy in cost and ease of production, and to provide a light and resilient roller-cage which will operate smoothly and noiselessly; and second, to provide a cage especially adapted to space the rollers in respect to each other and retain them on the inner cone race of a taper roller bearing in which means, other than the cage, are provided for keeping the axes of the conical rollers in convergence towards a common origin.

In my pending application serially numbered 172,405 I have described a taper roller bearing in which the cage is not relied upon for keeping the axes of the conical rollers convergent toward a common origin, and since the present invention relates particularly to that type of taper roller bearing, it will be illustrated and described in connection with the subject-matter of that application.

Figure 1:
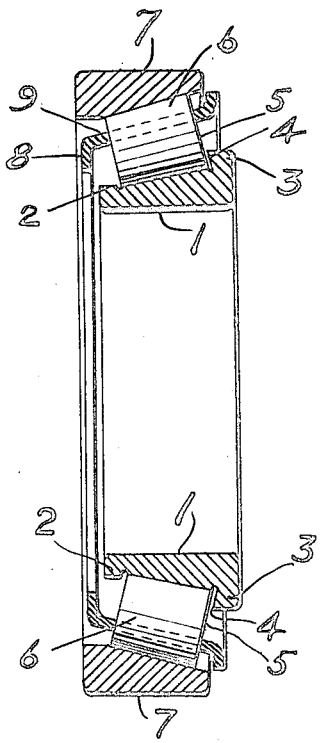
Figure 1, is a transverse sectional view of a taper roller bearing embodying features of the invention.
Figure 2:
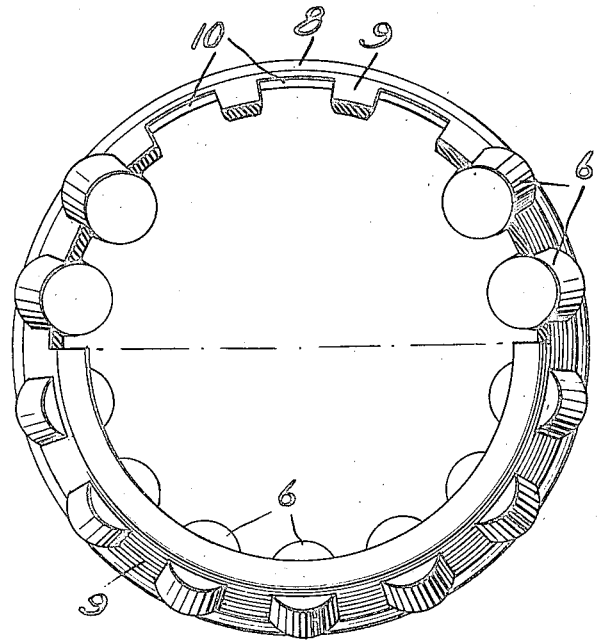
Figure 2, is an end view with parts broken away and with the inner and outer cone-races removed.
Figure 3:
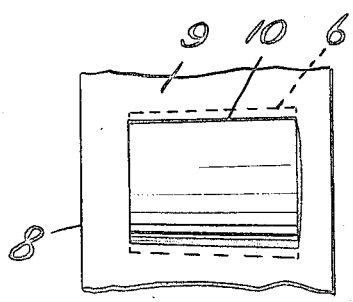
Figure 3, is a face view, drawn to an enlarged scale, of a portion of the cage showing a roller in position.
Figure 4:
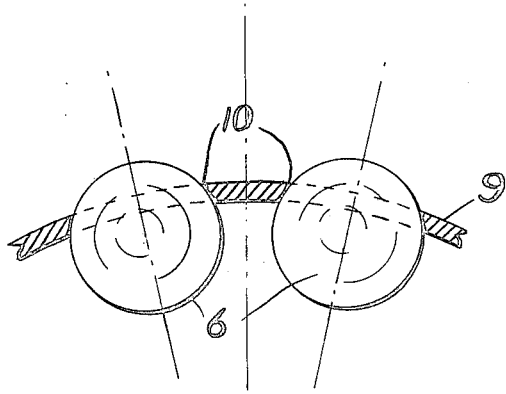
Figure 4, is a sectional view of a portion of the cage showing rollers in position.

In the drawings 1, is the inner cone-race and it is provided at its ends with shoulders 2 and 3. The shoulder 3, is provided with a re-entrant conical face 4. In use the ends 5 of the taper rollers 6, contact with the re-entrant face 4, at two separated points only of sliding contact, and this keeps the axes of the rollers convergent towards a common origin, at the apex of the cone that would be formed by a prolongation of the bearing. 7, is the outer cone-race. 8, is a sheet metal band having smooth conical faces 9 provided with openings 10, the walls of which envelop the rollers at a point between their axes and their line of contact with the outer cone race. This sheet metal band is provided with an outward flange at its larger end and with an inward flange at its smaller end. The function of the sheet metal band 8, is to include the rollers upon the inner race and to space successive or adjacent rollers from contact with each other. Since the constraint upon the rollers to make them move in their correct path is supplied by the interaction of the flat ends of the rollers and the conical shape of the shoulder 3, the cage is very light and resilient and therefore it operates smoothly and noiselessly. The roller openings 10, permit the rollers to emerge outwardly from the cage for the purpose of bearing contact with the outer race, but they are too narrow to permit of any great amount of radially outward displacement of the rollers, which are thus snugly confined upon the inner race or cone forming together with it, and also the cage, a self-contained unit.

From the foregoing description it is evident that the cage and the other elements of the bearing co-act in the production of the result, for the latter constrain the rollers in their proper path and the former, relieved of that function, simply spaces the rollers and attaches them to the inner race.

What I claim is:

1. A spacer and retainer for taper roller bearings comprising a light and resilient sheet metal band having smooth unobstructed conical inside and outside surfaces provided with roller openings which embrace the rollers at a point between their axes and their line of contact with the outer raceway and the edges of said openings making contact throughout their length with the sides and ends of the rollers, and having an outward flange at its larger end and an inward flange at its smaller end, the said flanges being constructed and arranged to reinforce said band and resist radial stresses and prevent deformation thereof, substantially as described.

2. In a roller bearing, an inner race member having an undercut shoulder at one side of the raceway, roller members having a quadrilateral formation in longitudinal section, and a cage member having quadrilateral openings the edges of which fit the contained roller members throughout the combined length of the edges of the individual openings, the said edges being maintained in contact with the periphery of the contained roller and the respective ends thereof.

3. In a roller bearing, an inner race member having an undercut guiding shoulder at one side of the raceway, taper roller members having the entire areas of their ends formed in planes substantially perpendicular to the axes of the members whereby said members have a quadrilateral formation in longitudinal section, and a cage member having quadrilateral openings smaller than the maximum section of the rollers and the edges of which fit the contained roller member throughout the combined length of the edges of the individual openings, the said edges being maintained in contact with the periphery of the contained roller and the respective ends thereof.

ELMER E. NEAL.